United States Patent [19]
Fiore

[11] Patent Number: 5,911,531
[45] Date of Patent: Jun. 15, 1999

[54] APERTURE FOR MOLDED PLASTIC COMPONENTS AND METHOD OF MANUFACTURE

[75] Inventor: Steven J. Fiore, Hilton, N.Y.

[73] Assignee: Xerox Corporation, Stamford, Conn.

[21] Appl. No.: 08/969,828

[22] Filed: Nov. 13, 1997

Related U.S. Application Data

[60] Provisional application No. 60/043,494, Apr. 11, 1997.

[51] Int. Cl.⁶ .................................................. B41J 29/02
[52] U.S. Cl. .............................. 400/692; 400/694; 399/24
[58] Field of Search .................................. 400/691, 692, 400/693, 693.1, 694; 399/24, 25, 26, 27, 110, 111, 113, 120, 125

[56] References Cited

U.S. PATENT DOCUMENTS

| | | | |
|---|---|---|---|
| 4,895,268 | 1/1990 | Hyde | 220/85 R |
| 5,021,828 | 6/1991 | Yamaguchi et al. | 355/209 |
| 5,244,606 | 9/1993 | Maus et al. | 264/1.3 |
| 5,262,899 | 11/1993 | Iizuka | 359/811 |
| 5,435,959 | 7/1995 | Williamson et al. | 264/221 |
| 5,580,507 | 12/1996 | Williamson et al. | 264/221 |
| 5,819,139 | 10/1998 | Harlan et al. | 399/110 |

*Primary Examiner*—Ren Yan
*Attorney, Agent, or Firm*—John S. Wagley

[57] ABSTRACT

A plastic molded article including a body is provided. The body includes a first surface thereof and a second surface thereof. The second surface is spaced from the first surface. The body defines a first cavity extending inwardly from the first surface and a second cavity extending inwardly from the second surface. The first cavity overlaps the second cavity so as to form an aperture extending at least partially through the plastic molded article. The body further defines a recess extending inwardly from at least one of the first cavity and the second cavity at a location where the first cavity overlaps the second cavity so as to accommodate flash which may be formed during the molding process of the plastic molded article.

15 Claims, 9 Drawing Sheets

APERTURE FOR MOLDED PLASTIC COMPONENTS AND METHOD OF MANUFACTURE

This application is based on a provisional application Ser. No. 60/043,494, filed Apr. 11, 1997.

BACKGROUND OF THE INVENTION

This invention relates generally to molded plastic components for use in a printing machine, and more particularly concerns molded plastic components with integral apertures.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In modern printing machines, such as those described above, efforts are used to utilize modern lightweight and low cost recyclable materials. Chief among these low cost lightweight materials are plastics. These plastic components are molded, typically in a molding machine. For example, with a screw type auger or hydraulic ram in which the molded material is compressed and liquefied to conform to a shape of a mold. Many of these plastic components represent housings and supports which support rotating elements. Therefore, many of these plastic housings and supports require the inclusion of an aperture or bore to which the shaft may be secured.

To permit the removal of a plastic part from a mold cavity, the mold cavity typically has at least two portions or halves which are separated in order to remove the molded article. While it is somewhat simple to provide a bore or opening in a direction normal to the contact surface or parting line between the mold halves, frequently for more complex housings bores and apertures must be located in directions that are often normal to each other. Therefore, it becomes necessary to provide apertures or bores that are located in a direction parallel to the parting line or surface at which the die halves mate. To provide an aperture that has a centerline parallel to the parting line, it is necessary to have the centerline of the aperture coincident with the parting line. This configuration can be obtained by placing one half of the whole workpiece in each of the die half. When this is done, the hole often requires a side pull or a third die component in a direction parallel with the axis of the hole. Alternatively, a secondary operation such as drilling may be required to provide a bore or aperture with sufficient roundness and size control. The use of side pulls and secondary operations such as drilling adds significantly to the cost of the plastic component.

The plastic components mentioned above are used throughout the printing machine. The use of lightweight and low cost materials is particularly important in those components that must be removed by the machine operator and those components which have a life less than that of the printing machine. One common application where components have a life less than that of the machine is in a CRU, a customer replaceable unit, which cannot be replaced by the customer at the end of the life or at the premature failure of one of the xerographic components.

In printing machines such as those described above, a CRU is a customer replaceable unit which can be replaced by a customer at the end of life or at the premature failure of one or more of the xerographic components. The CRU concept integrates various subsystems whose useful lives are predetermined to be generally the same length. The service replacement interval of the CRU insures maximum reliability and greatly minimizes unscheduled maintenance service calls. Utilization of such a strategy, allows customers to participate in the maintenance and service of their copiers/printers. CRUs insure maximum up time of copiers and minimize downtime and service cost due to end of life or premature failures.

It is desirable to have a CRU that enables a variety of machine subsystems to be incorporated into a single unit while maximizing the useful life of each component. It is further desirable to utilize a CRU that allows service to a machine to be performed efficiently and at a relatively low cost and in some cases to be serviced by the user himself. It is a further benefit to have the ability to reuse and recycle various CRU components in today's climate of environmental awareness.

The lightweight low cost molded plastic components mentioned above are particularly well suited for a customer replacement unit. The CRU includes a number of shafts and other rotating and pivoting components which must be secured to bores or apertures. Many of these components within a CRU require the use of components with bores which are normal with each other which require the use of side pulls or secondary operations such as drilling to provide for an accurate bore that has a centerline parallel to the parting line of the mold.

With the cycling of a molding machine and with the separation of the molded part from the mold, over time, the surface of the mold wears. This is particularly true for the mating surfaces of each of the two or more die halves or partitions that mate to form the shape of the plastic component. Further, in order to insure that the plastic component does not have a void or lacks material in a particular part within the molding machine, typically the mold is filled with excess material which may leak at the surfaces between the mold halves. The mold halves also wear at their contact surfaces so that a parting line forms between each of the mold halves. It is the presence of the parting line and the flash that occurs at the parting line that fills partially the bores and apertures that are created along the parting line. To remove the flash at the parting line, the side pulls and the drilling operations are required.

The present invention is directed to alleviate at least some of the aforementioned problems.

Figure 2:
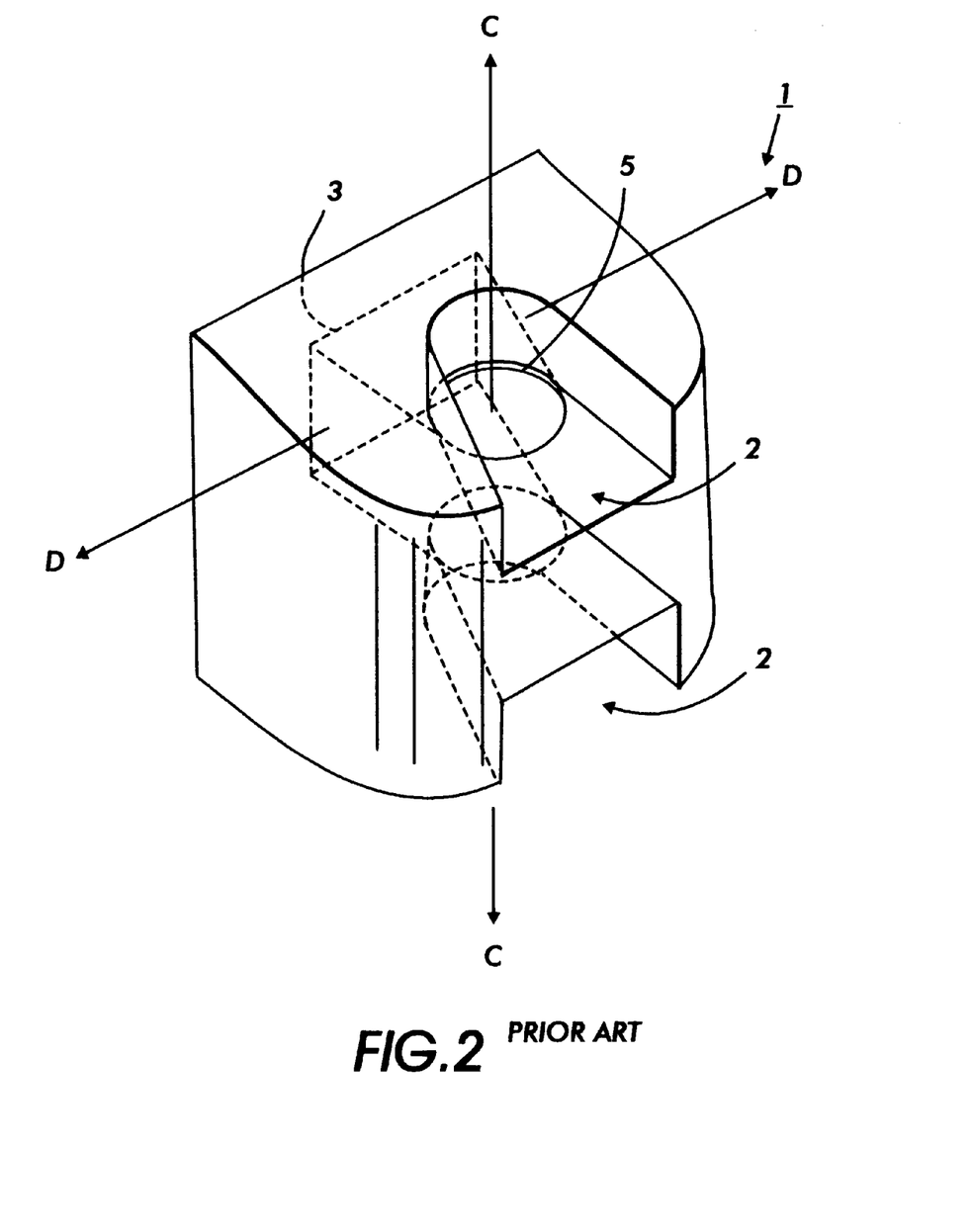
FIG. 2 is a perspective view of a prior art plastic component.

More recently, plastic components have been designed which have a hole or bore with an axis parallel to the parting line in which the hole or aperture is molded in halves with two or three halves resulting in a full hole. Such a plastic component is shown in FIG. 2. The plastic component 1 includes a pair of front cavities 2 which overlap with a rear cavity 3. The central portions of the cavities 2 and 3 are semi circular whereby the cavities 2 and 3 combine to form an aperture bore 4 having an axis CC in the vertical direction. The plastic component 1 is molded from a pair of molds and has a parting line on a plane formed by axis CC and line DD which is perpendicular to aperture axis CC.

Figure 3:
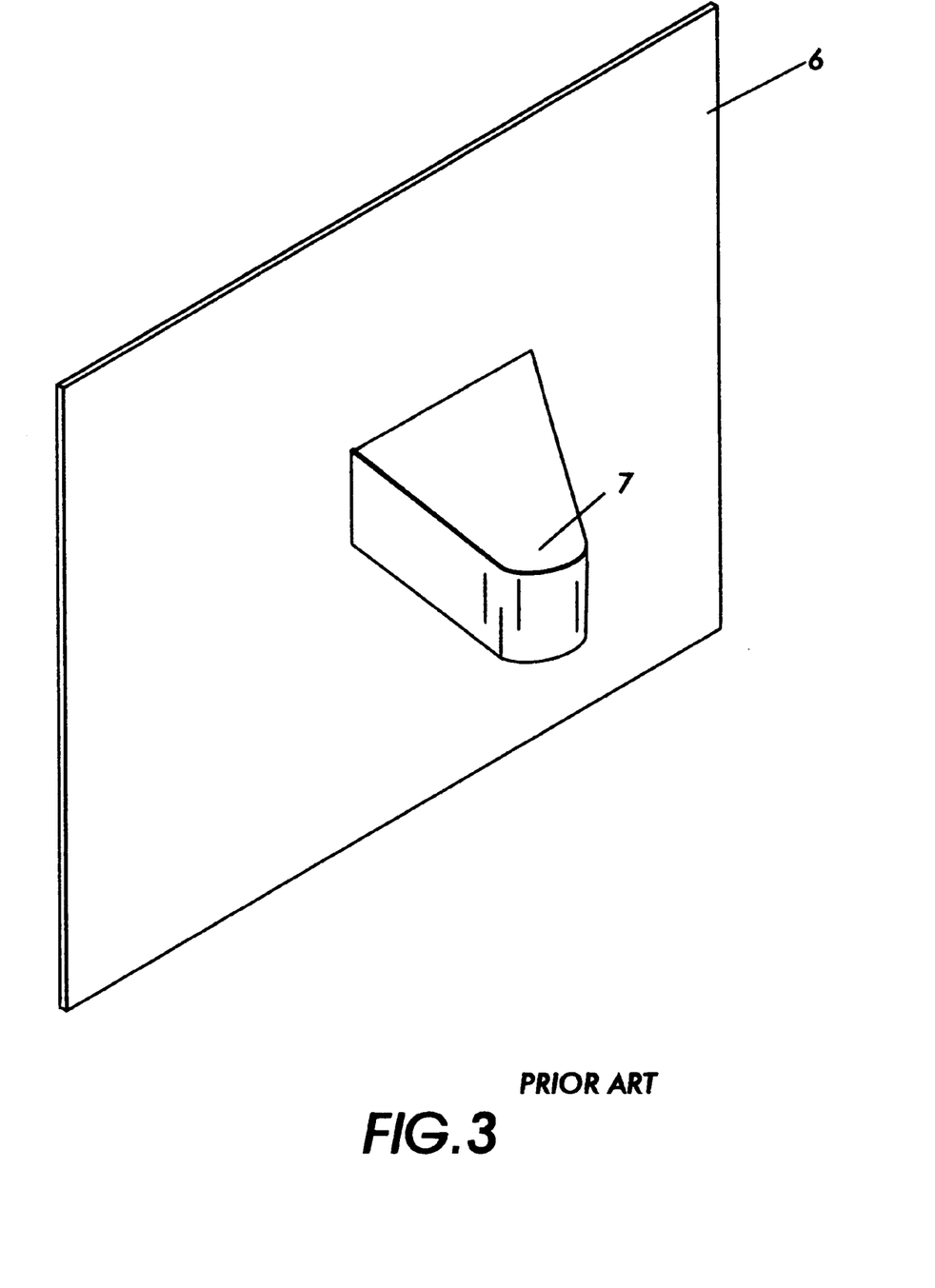
FIG. 3 is a perspective view of a first mold die half for use in manufacturing the component of FIG. 2.
Figure 4:
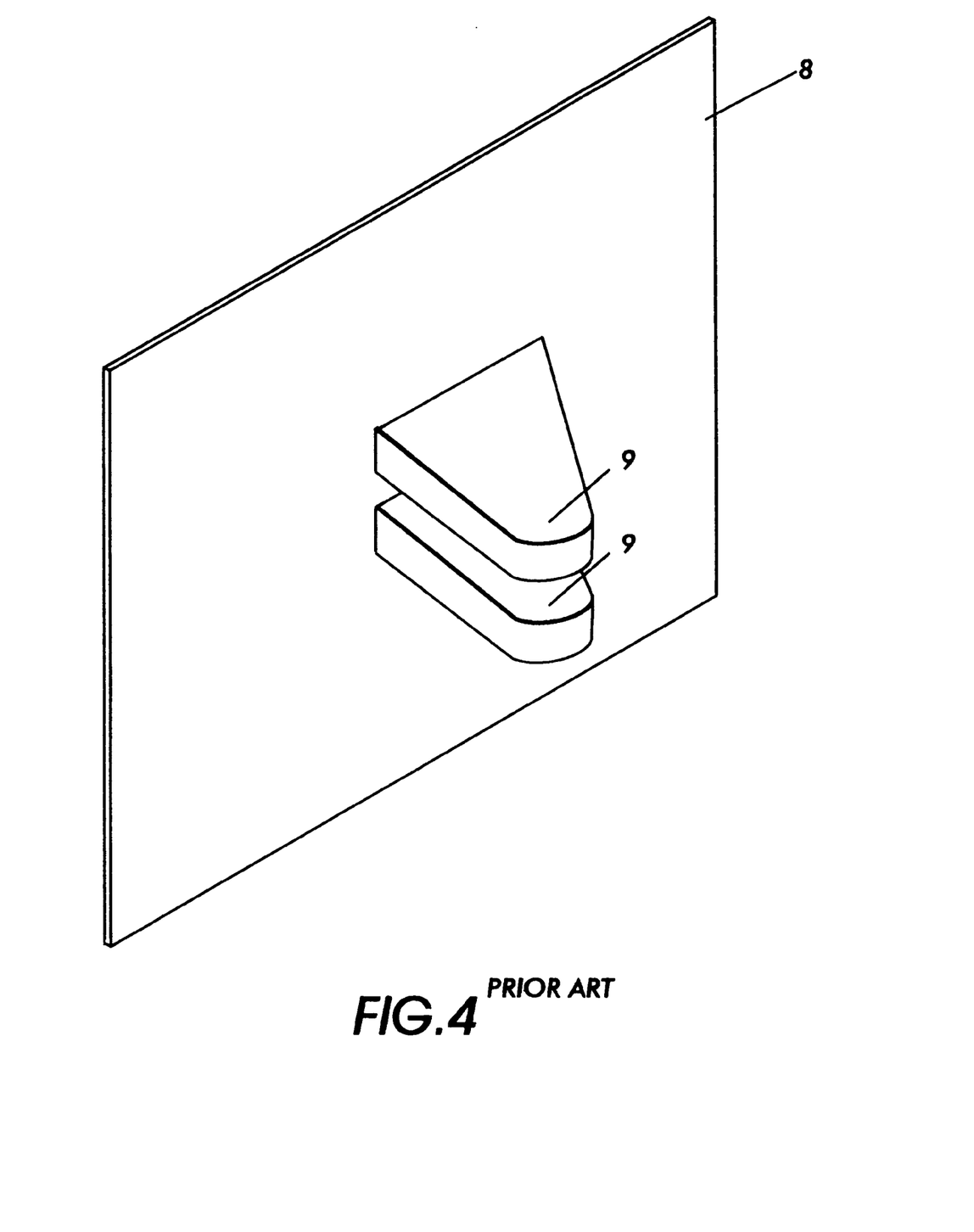
FIG. 4 is a perspective view of a second mold die half for use in manufacturing the component of FIG. 2.

Now referring to FIGS. 3 and 4, a pair of die plates 5 and 6 respectively are shown. For simplicity, the die plates 5 and 6 show only the features required to provide the cavities to the plastic component 1 of FIG. 2. As shown in FIG. 3, the first die plate 6 includes a front die plate protrusion 7. The front die plate 7 is used to form the rear cavity 3 of the plate component 1 of FIG. 2.

Referring now to FIG. 4, the second die plate 8 preferably includes two second die plate protrusions 9. The second die plate protrusions 9 form the front cavities 2 of FIG. 2. To provide the aperture bore 4, the second die protrusions 9 are spaced apart a distance equal to the thickness of the first die plate protrusion 7 so that the upper and lower surfaces of the first die protrusions 7 are in mating contact with the inner surfaces of the second die protrusions 9.

As the opposed faces of the first die plate protrusions 7 wear against the inner surfaces of second die plate protrusions 9, a gap is formed between the protrusions 7 and 9. The gap between the protrusions results in flash 5 as shown in FIG. 2 which progresses inwardly into the aperture bore 4. The presence of the flash 5 requires that secondary operations such as drilling are required to provide for an accurate bore 4.

The following disclosures may relate to various aspects of the present invention.

U.S. Pat. No. 5,580,507
Patentee: Williamson et al.
issue Date: Dec. 3, 1996

U.S. Pat. No. 5,435,959
Patentee: Williamson et al.
Issue Date: Jul. 25, 1995

U.S. Pat. No. 5,262,899
Patentee: Iizuka
Issue Date: Nov. 16, 1993

U.S. Pat. No. 5,244,606
Patentee: Maus et al.
Issue Date: Sep. 14, 1993

U.S. Pat. No. 4,895,268
Patentee: Hyde
Issue Date: Jan. 23, 1990

Some portions of the foregoing disclosures may be briefly summarized as follows:

U.S. Pat. No. 5,580,507 discloses a method of making a mold from a model. The aperture has a configuration generally corresponding to the shape of the model. A mold is formed around a model and the model is removed. Material is then placed into the mold to form the part.

U.S. Pat. No. 5,435,959 discloses a method of making a mold from a model. The aperture has a configuration generally corresponding to the shape of the model. A mold is formed around a model and the model is removed. Material is then placed into the mold to form the part.

U.S. Pat. No. 5,262,899 discloses an optical apparatus having a mount molded of plastic including a mount sliding surface formed on the mount and providing a fiducial surface in the direction of the optic axis, and a depression formed in the area of a parting line during molding on the mount sliding surface.

U.S. Pat. No. 5,244,606 discloses a molded disk which is transferred out of the mold with short stroke low-mass motions of a pair of mechanical guides which can grip, then release, the O.D. edge of the molded disk, when acting in coordination with movable mold members have in undercuts for molded on retention of the inner portion of the molded disk.

U.S. Pat. No. 4,895,268 discloses a blow molding process for making products that have at least one substantially solid attachment projection unitary with and projection outwardly from an exterior wall. The process includes the step of enclosing a molten plastic parison within a cavity formed by cooperating blow molding die parts, a void in fluid communication with with such cavity and having a configuration corresponding to that desired for the attachment projection being provided at a parting line.

SUMMARY OF THE PRESENT INVENTION

In an accordance with one aspect of the present invention, there is provided a plastic molded article including a body. The body includes a first surface thereof and a second surface thereof. The second surface is spaced from the first surface. The body defines a first cavity extending inwardly from the first surface and a second cavity extending inwardly from the second surface. The first cavity overlaps the second cavity so as to form an aperture extending at least partially through the plastic molded article. The body further defines a recess extending inwardly from at least one of the first cavity and the second cavity at a location where the first cavity overlaps the second cavity so as to accommodate flash which may be formed during the molding process of the plastic molded article.

Pursuant to another aspect of the present invention, there is provided a customer replaceable unit for use in a printing machine. The unit includes a housing for mounting component having a service life less than the printing machine and a plastic molded component. The plastic molded component is operably associated with the housing. The component includes a body. The body includes a first surface thereof and a second surface thereof. The second surface is spaced from the first surface. The body defines a first cavity extending inwardly from the first surface and a second cavity extending inwardly from the second surface. The first cavity overlaps the second cavity so as to form an aperture extending at least partially through the plastic molded article. The body further defines a recess extending inwardly from at least one of the first cavity and the second cavity at a location where the first cavity overlaps the second cavity so as to accommodate flash which may be formed during the molding process of the plastic molded article.

Pursuant to a further aspect of the present invention, there is provided an electrophotographic printing machine of the type including a customer replaceable unit. The unit includes a housing for mounting component having a service life less than the printing machine and a plastic molded component. The plastic molded component is operably associated with the housing. The component includes a body. The body includes a first surface thereof and a second surface thereof. The second surface is spaced from the first surface. The body defines a first cavity extending inwardly from the first surface and a second cavity extending inwardly from the second surface. The first cavity overlaps the second cavity so as to form an aperture extending at least partially through the plastic molded article. The body further defines a recess extending inwardly from at least one of the first cavity and the second cavity at a location where the first cavity overlaps the second cavity so as to accommodate flash which may be formed during the molding process of the plastic molded article.

Pursuant to a yet another aspect of the present invention, there is provided. a mold including a first die plate and a second die plate. The first die plate includes a first die plate surface thereof, a first die plate protrusion extending outwardly from the first die plate surface and a first die plate lip extending outwardly form the first die plate protrusion. The second die plate includes a second die plate surface thereof, a second die plate protrusion extending outwardly from the second die plate surface and a second die plate lip extending outwardly form the second die plate protrusion. The first die plate protrusion and the second die plate protrusion cooperating so as to be used to mold an article including a aperture in the molded article.

BRIEF DESCRIPTION OF THE DRAWINGS

Other features of the present invention will become apparent as the following description proceeds and upon reference to the drawings, in which.

DETAILED DESCRIPTION OF THE PRESENT INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
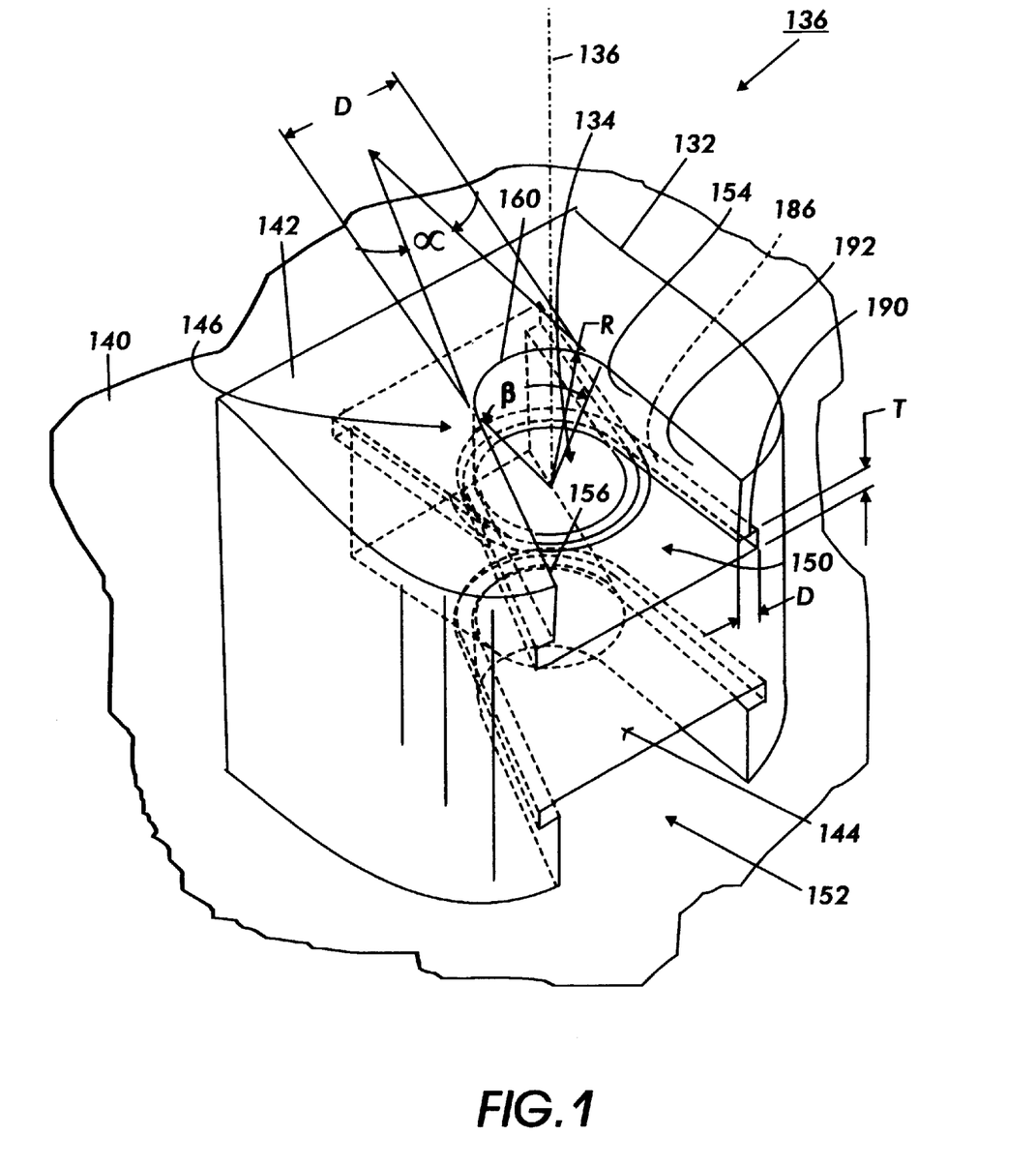
FIG. 1 is a perspective view of a plastic component including the aperture according to the present invention.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the component with a precision aperture of the present invention may be employed in a wide variety of devices and is not specifically limited in its application to the particular embodiment depicted herein.

Figure 5:
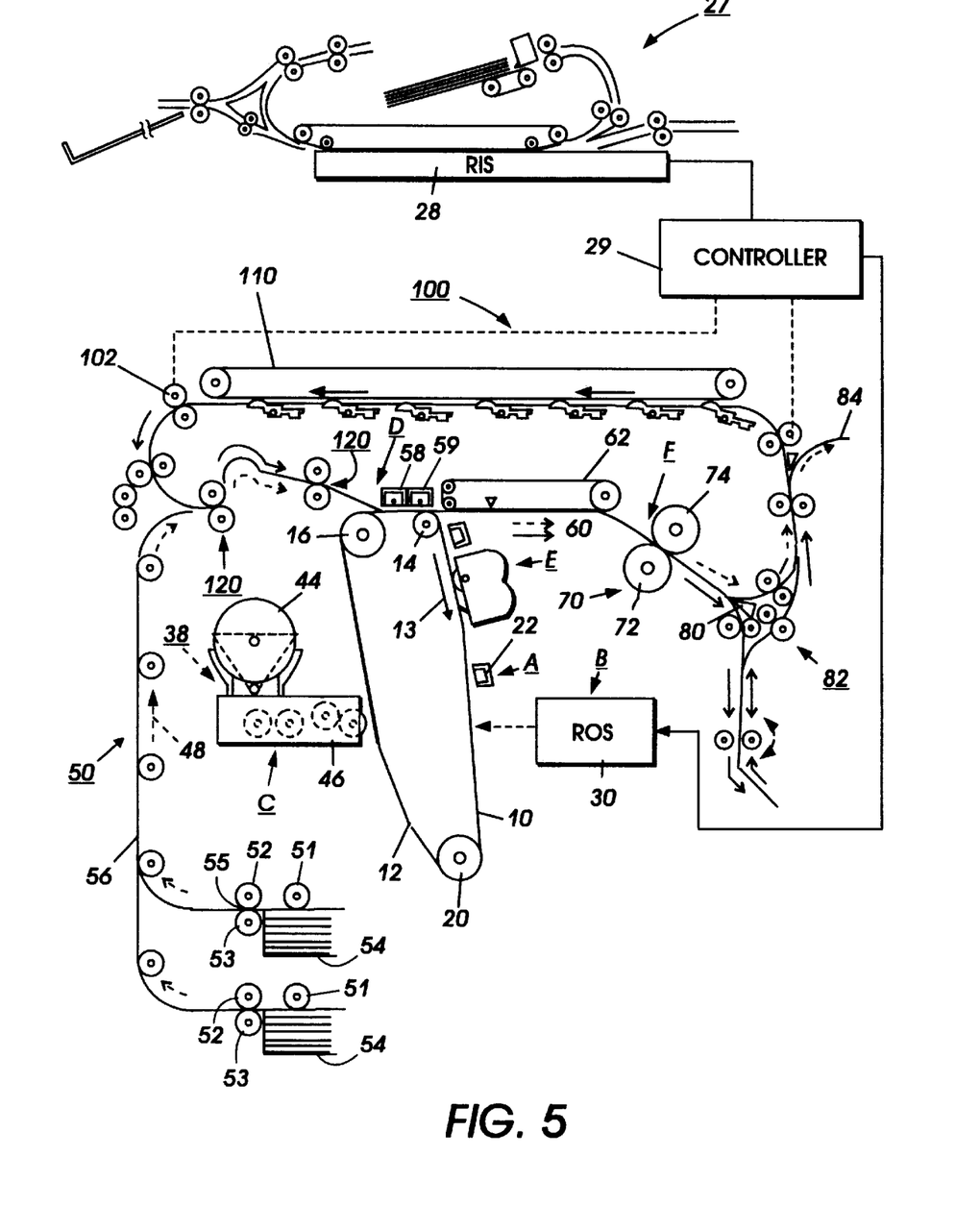
FIG. 5 is a schematic elevational view of a typical electrophotographic printing machine utilizing the plastic component with molded aperture of the present invention.

Referring to FIG. 5 of the drawings, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 5 schematically illustrates an electrophotographic printing machine which generally employs a photoconductive belt 10. Preferably, the photoconductive belt 10 is made from a photoconductive material coated on a ground layer, which, in turn, is coated on an anti-curl backing layer. Belt 10 moves in the direction of arrow 13 to advance successive portions sequentially through the various processing stations disposed about the path of movement thereof. Belt 10 is entrained about stripping roller 14, tensioning roller 16 and drive roller 20. As roller 20 rotates, it advances belt 10 in the direction of arrow 13.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or greyscale rendition of the image which is transmitted to a modulated output generator, for example the raster output scanner (ROS), indicated generally by reference numeral 30. Preferably, ESS 29 is a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 5 after the electrostatic latent image is developed, the toner powder image present on belt 10 advances to transfer station D. A print sheet 48 is advanced to the transfer station, D, by a sheet feeding apparatus, 50. Preferably, sheet feeding apparatus 50 includes a nudger roll 51 which feeds the uppermost sheet of stack 54 to nip 55 formed by feed roll 52 and retard roll 53. Feed roll 52 rotates to advance the sheet from stack 54 into vertical transport 56. Vertical transport 56 directs the advancing sheet 48 of support material into the registration transport 120 of the invention herein, described in detail below, past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. The sheet is then detacked from the photoreceptor by corona generating device 59 which sprays oppositely charged ions onto the back side of sheet 48 to assist in removing the sheet from the photoreceptor. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. Preferably, fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 84 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the non-transferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc.. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 6:
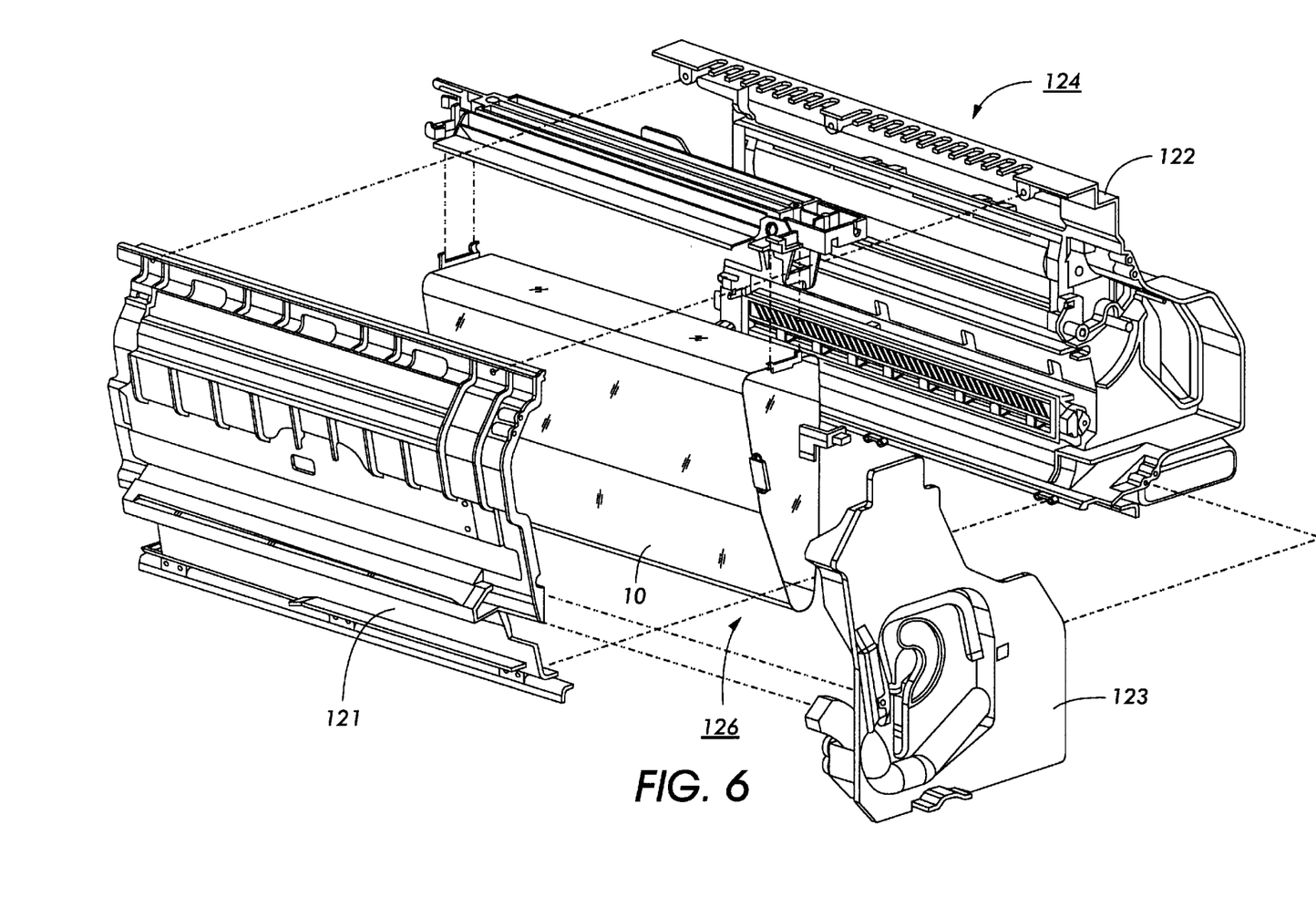
FIG. 6 is a perspective view of a xerographic CRU for use in the printing machine of FIG. 5.

Turning next to FIG. 6 there is illustrated a perspective view of the xerographic CRU 124. The xerographic CRU module mounts and locates xerographic subsystems in relationship to the photoreceptor module and xerographic subsystem interfaces. Components contained within the xerographic CPU include the transfer/detack corona generating devices, the pretransfer paper baffles, the photoreceptor cleaner, the charge scorotron, the erase lamp, the photoreceptor belt, the noise, ozone, heat and dirt (NOHAD) handling manifolds and filter, the waste bottle, the drawer connector, CRUM, the automatic cleaner blade engagement/retraction and automatic waste door open/close device.

A summary of the xerographic CRU components and the function of each is as follows:

Cleaner (Doctor blade and Disturber Brush): remove untransferred toner from the photoreceptor; transport waste toner and other debris to a waste bottle for storage; assist in controlling the buildup of paper talc, filming and comets on the photoreceptor belt.

Precharge Erase Lamp: provides front irradiation of the photoreceptor to the erase the electrostatic field on the surface Charge Pin Scorotron: provides a uniform charge level to the photoreceptor belt in preparation for imaging.

Photoreceptor Belt: charge retentive surface advances the latent image portions of the belt sequentially through various xerographic processing stations which converts electrostatic field on the surface Pretransfer Paper Baffles: directs and controls tangency point between the paper and photoreceptor surface. Creates an "S" bend in paper to flatten sheet in the transfer zone.

Transfer Wire Corotron: places a charge on the paper as in passes under the corotron. The high positive charge on the paper causes the negative charged toner to transfer from the photoreceptor to the paper.

Detack Pin Corotron: assist in removing paper with its image from the photoreceptor by neutralizing electrostatic fields which may hold a sheet of paper to photoreceptor. Sheet self strips as it passes over a stripper roll on belt module.

NOHAD Dirt Manifolds and Filter: removes airborne toner dirt and contaminates from the moving air before it leaves the CRU. The captured toner and contaminates are deposited in a dirt filter contained in the xerographic CRU.

Electrical Drawer Connector: provides connector interface for the CRUM; provides input/output for machine control.

CRUM Chip: allows machine to send reorder message (user interface or automatically) for CRU or other; method to monitor number of copies purchased by the customer and warrantee the CRU for premature CRU failures; provides handshake feature with machine to ensure correct CRU installed in compatible machine; shuts down machine at the appropriate CRU kill point; enables market differentiation; enables CRU life cycle planning for remanufacture; enables remote diagnostics; provides safety interlock for the ROS.

ROS and Developer Interface: provides a developer interface window to allow transfer of toner for imaging from developer donor roll to photoreceptor belt surface latent image. Also, provides critical parameter mounting and location link which ties ROS to photoreceptor module to ensure proper imaging and eliminate motion quality issues.

BTAC Sensor Interface: provides interface window to monitor process controls.

Registration Transport Interface: provides outboard critical parameter location and mounting feature.

Prefuser Transport Interface: provides critical parameter location and mounting feature.

The CRU subsystems are contained within the xerographic housing. The housing consist of three main components which include the front end cap 123, right side housing 122 and left side housing 121. The xerographic housing is a mechanical and electrical link. It establishes critical parameters by mounting and locating subsystems internal and external to the CRU in relationship to the photoreceptor module and other xerographic subsystem interfaces. The housing allows easy reliable install and removal of the xerographic system with out damage or difficulty.

The front end cap joins the right and left side housings together on the outboard end of the CRU. The front end cap also functions as a mechanical link with features which mount and locate on the outboard of the machine the photoreceptor module, ROS and registration transport in relationship to one another in order to achieve mechanical critical parameters. The end cap also mounts spring loaded slide, waste door pivot and blade pivot links which allows the customer to simultaneously engage and disengage the cleaner waste door and blade during install and removal of the CRU when the photoreceptor module handle is rotated. When removed from the machine, the blade pivot link insures the cleaner blade remains retracted to prevent photoreceptor belt and blade damage during CRU install and removal. The waste door pivot link secures the cleaner waste bottle door closed when the CRU is removal to prevent spillage of toner during shipping. The end cap also mounts a dirt manifold which links the left side housing developer manifold with the NOHAD dirt filter in the right side housing. The manifolds transport airborne toner and other contaminates to the dirt filter by means of an airflow stream.

The right side housing mounts and locates a number of the xerographic subsystems and interfaces internal and external to the CPU. The right side housing mounts one half of the transfer and detack assembly, charge scorotron, photoreceptor belt and drawer connector. These components are allow to float within the CRU housing. They achieve critical parameter locations with the photoreceptor module and machine frame when the CRU housing is fully installed and the photoreceptor module handle engages the tension roll. Both the charge scorotron and transfer/detack subsystem are located by means of spring loads located on the photoreceptor module.

The right side housing also contains molded scorotron retention features and mounts and locates a charge spring which retracts the charge scorotron subsystem to the housing when the CRU is removed from the machine. The spring enables successful install and removal of the CRU without damage to the charge scorotron.

The right side housing has molded ports in the charge scorotron mounting area to allow non-contaminated air to flow over the charge device in order to remove any contaminates which would affect the performance of the unit. i.e. (nitrous oxide a cause of parking deletions).

The right side housing features molded vents at the transfer/detack location. The vents also allow sufficient air over the transfer and detack devices to prevent any nitrous oxide contamination.

The housing has special molded features which mount and locate the cleaner assembly, precharge erase lamp, waste bottle and NOHAD air duct and filter. The right housing mounts and locates the interfaces of the cleaner blade and waste door pivot features. The housing positions the NOHAD air duct and filter to the blower to allow sufficient airflow to capture airborne contaminates and toner.

The photoreceptor belt 10 is partially retained by molded fingers with are located on the inboard and outboard areas of the right housing. Other retaining belt fingers are located on the transfer detack housing and left side housing. The housing has a molded feature at the lower outboard end which positions the belt on the photoreceptor module 126 to prevent belt damage.

The left side housing serves as protective cover for the photoreceptor belt and provide interface windows with various subsystems surrounding the CRU. The interface windows include the BTAC, developer and ROS. The housing also mounts one half of the transfer detack subsystem. It also provides an interface window with the registration transport for the entry of paper. The developer dirt manifold is also mounted and located on the left side housing. Two of the belt retaining fingers and a molded feature at the lower outboard end retain and position the photoreceptor belt during install and removal. The left side housing has a molded baffle which covers ROS on outboard end to prevent customer exposure to the ROS beam.

The integrated CRU housing ramps the registration transport and prefuser transport into position when the unit is installed in the machine. The CRU housing makes 22 critical mechanical and electrical interfaces almost simultaneously. All the housings possess double bosses which allows the unit to be secured together during the manufacturing build. If both bosses happen to strip out over time, a longer screw can be used to secure the parts due to sufficiently deep bosses.

According to the present invention and referring to FIG. 1, a plastic component 130 is shown. The plastic component 130 is shown in FIG. 1 as a fairly simple shape. It should be appreciated, however, that a plastic component according to the present invention may have any complex shape and may include a multitude of apertures in a variety of orientations. The plastic component 130 includes a body 132. The body 132 may have any suitable shape and may be made of any suitable durable moldable material. For example, the body 132 is typically made of a plastic or polypropylene or polystyrene.

The body 132 defines a body aperture 134 having an aperture centerline 136. The aperture centerline 136 is preferably parallel to parting line plane 140. Parting line plane 140 represents the plane or surface in which the two mold halves that have formed the plastic component 130 are joined.

The body 132 includes a first surface 142 extending outwardly from parting line plane 140. The body 132 also includes a second surface 144 extending from a parting line plane 140 in a direction opposed to first surface 142 of the body 132. The body 132 includes a first cavity 146 extending inwardly from first surface 142 and a second cavity 150 extending inwardly from second surface 144. The first cavity 146 overlaps or intersects with second cavity 150 such that the cavities 146 and 150 cooperate to form aperture 134.

Preferably, the plastic component 130 further includes a third cavity 152 extending inwardly from second surface 144 of body 132. The third cavity 152 similarly intersects first cavity 146 such that the first cavity 146 second cavity 150 and third cavity 152 combine to form aperture 134. As can readily be seen from FIG. 1, the use of two cavities provides for a restraint of a mating shaft in all directions extending radially outwardly from centerline 136 of aperture 134. It should be appreciated, however, that the use of only two cavities may permit the rotation of a shaft mating with the aperture 134 in a direction normal to first surface 142 and second surface 144.

For simplicity and to ease in the molding process, the cavities 146, 150 and 152 preferably have a shape resembling that as if the portion removed to from the cavity had the shape of a tombstone.

Preferably, the cavities 150, 152 and 146 include a first planar portion 154 extending respectively from first surface 142 and second surface 144 as well as a second planar portion 156 likewise extending from either the first surface 142 or the second surface 144. The first planar portion and the second planar portion preferably converge inwardly forming an included angle α. The converging of the first and second planar portions 154 and 156 serve to ease in the removal of the plastic component 130 from the mold cavity. For ease of removal of the plastic component 130 preferably the angle α is greater than zero degrees.

The cavities 146, 150 and 152 further include at arcuate portion 160 which blends with first planar portion 156 and first planar portion 154. The arcuate portion 160 is defined by radius R which is approximately equal to one half the diameter D of the aperture 134. The arcuate portion 160 forms a sector of a circle defined by angle β. With β being the complement of angle α, e.g. for an α of 3 degrees β equals 177 degrees. Preferably, β is as close as possible to 180 degrees to provide for adding wrap around the mating shaft or component to which the aperture 134 mates.

Figure 7:
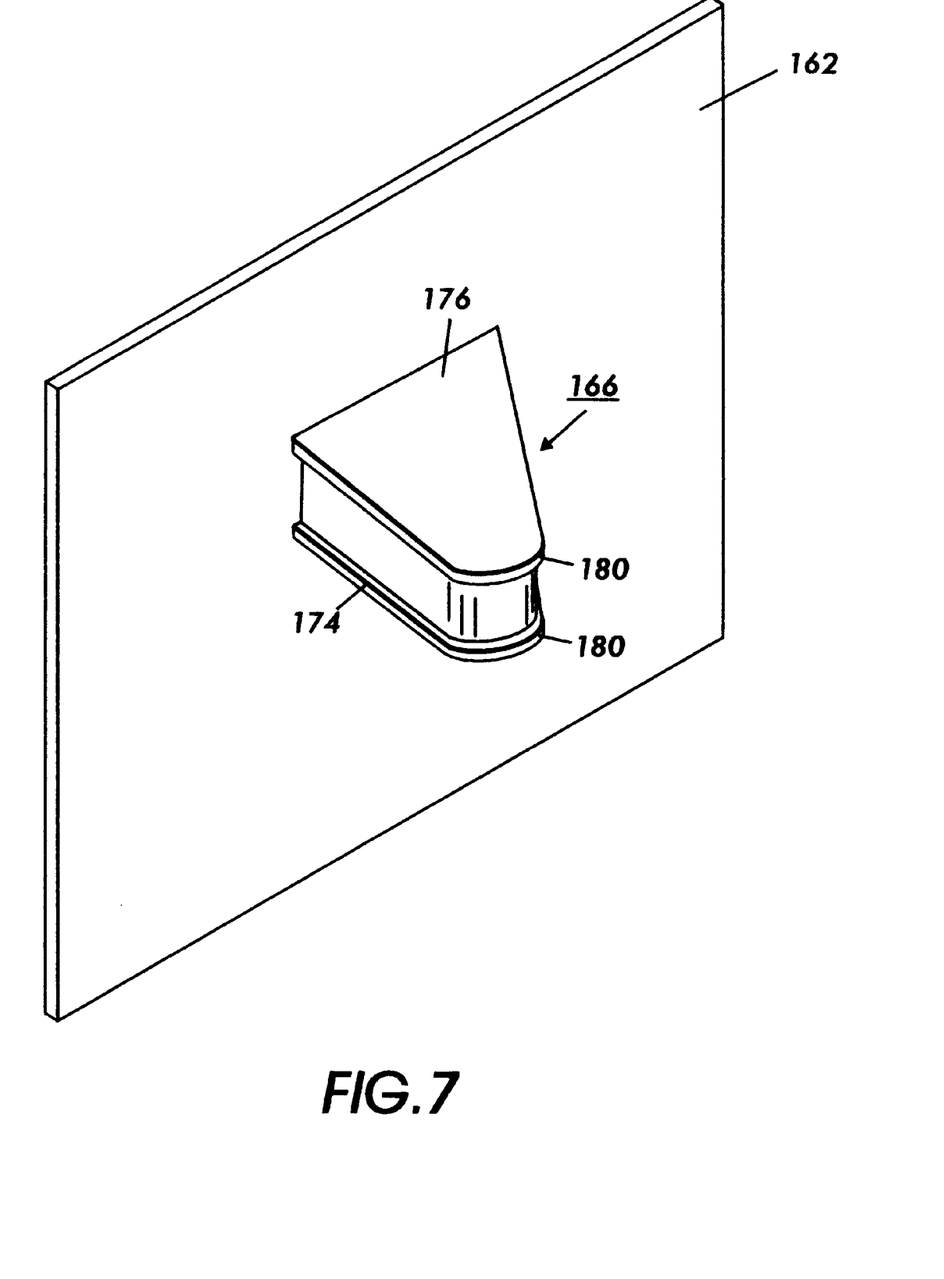
FIG. 7 is a perspective view of a first mold die half for use in manufacturing the component of FIG. 1.
Figure 8:
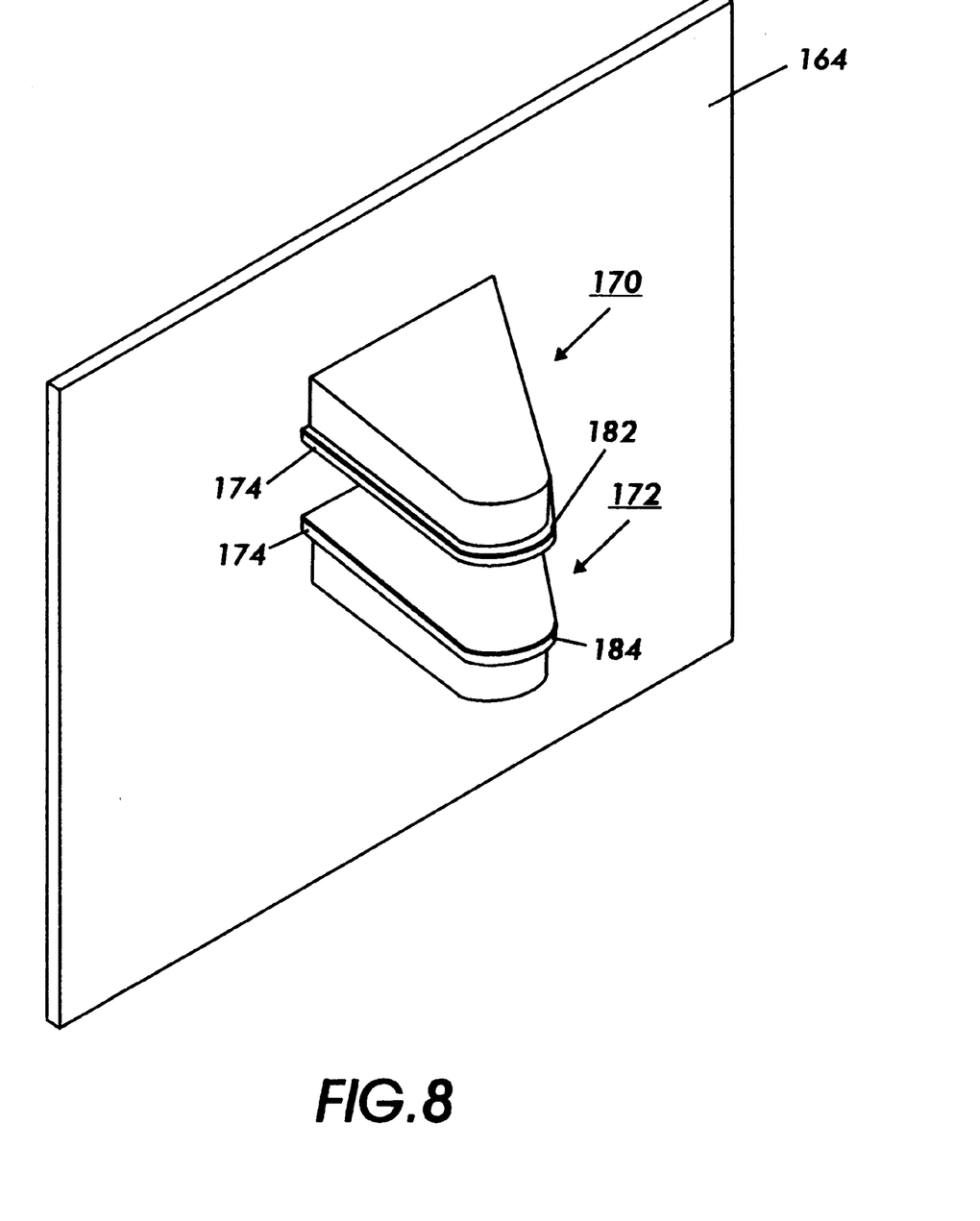
FIG. 8 is a perspective view of a second mold die half for use in manufacturing the component of FIG. 1.

Referring now to FIGS. 7 and 8, first and second die plates 162 and 164, respectively, are shown. The die plates 162 and 164 mate to form the plastic component. For simplicity, the first die plate and second die plates 162 and 164 are drawn with only the features required for providing the cavities for the plastic component 130 shown. It should be appreciated that the outer periphery of the body 132 may be provided with a mating shape formed in the first die plate 162 and the second die plate 164. Referring now to FIG. 7, the first die plate 162 includes a protrusion 166 which is used to form the first cavity 146 in the first surface 142 of the body 132. Likewise, as shown in FIG. 8, the second die plate 164 includes second protrusion 170 as well as third protrusion 172 which are used to form second cavity 150 and third cavity 152, respectively. Inner surfaces 174 of the second die plate 164 mate with outer surfaces 176 of the protrusion 166 of the first die plate 162. As the die plate surfaces 174 and 176 rub against each other during the opening and closing of the die plates 162 and 164, the surfaces 174 and 176 wear.

The wearing of the surfaces 176 of the first protrusion 166 with the surfaces 174 of the second and third protrusions 172 and 170, respectively, results in flash 180 forming between the cavities 150 and 146 and between cavities 152 and 146.

The applicant has discovered that by providing a lip 180 to the outer periphery of the first protrusion 166 of the first die plate 162, and by providing lips 182 and 184 respectively to the outer periphery of the protrusions 170 and 172, adjacent the surfaces 174 of the protrusions 170 and 172, a void 190 is formed extending outwardly from outer periphery 192 of the cavities 150, 152 and 146. The flash 180 that would otherwise form within the aperture 134 fills within the void 190 thereby permitting an extended life to the die plates 160 and 162 as well as avoiding the need for subsequent operations such as drilling of the aperture 134. The lips 182 and 184 may have any suitable shape but as shown in FIGS. 7 and 8, have a simple rectangular cross section to provide for easy manufacture. It should be appreciated that lips 182 and 184 may have any suitable cross section or shape in order to provide for the void 190. Referring again to FIG. 1, the void 190 has a depth D and a thickness T of sufficient size to accommodate the flash 186. For example, for an aperture 134 of approximately 10 millimeters, the depth D may be approximately 0.01 to 5 millimeters and the thickness T is 0.01 to 5 millimeters. While as shown in the die plates 160 and 164 of FIGS. 7 and 8, the lips 180, 182 and 184 extends substantially around the periphery of the protrusions 166, 170 and 172 thereby providing for a void or relief 190 extending substantially around the outer periphery 192 of the cavities 150, 152 and 146. It should be appreciated that the relief or void 190 is only necessary adjacent the aperture 134. The molding process does, however, lend itself to a lip and resulting void or relief 190 which extends substantially around the outer periphery 192.

Figure 9:
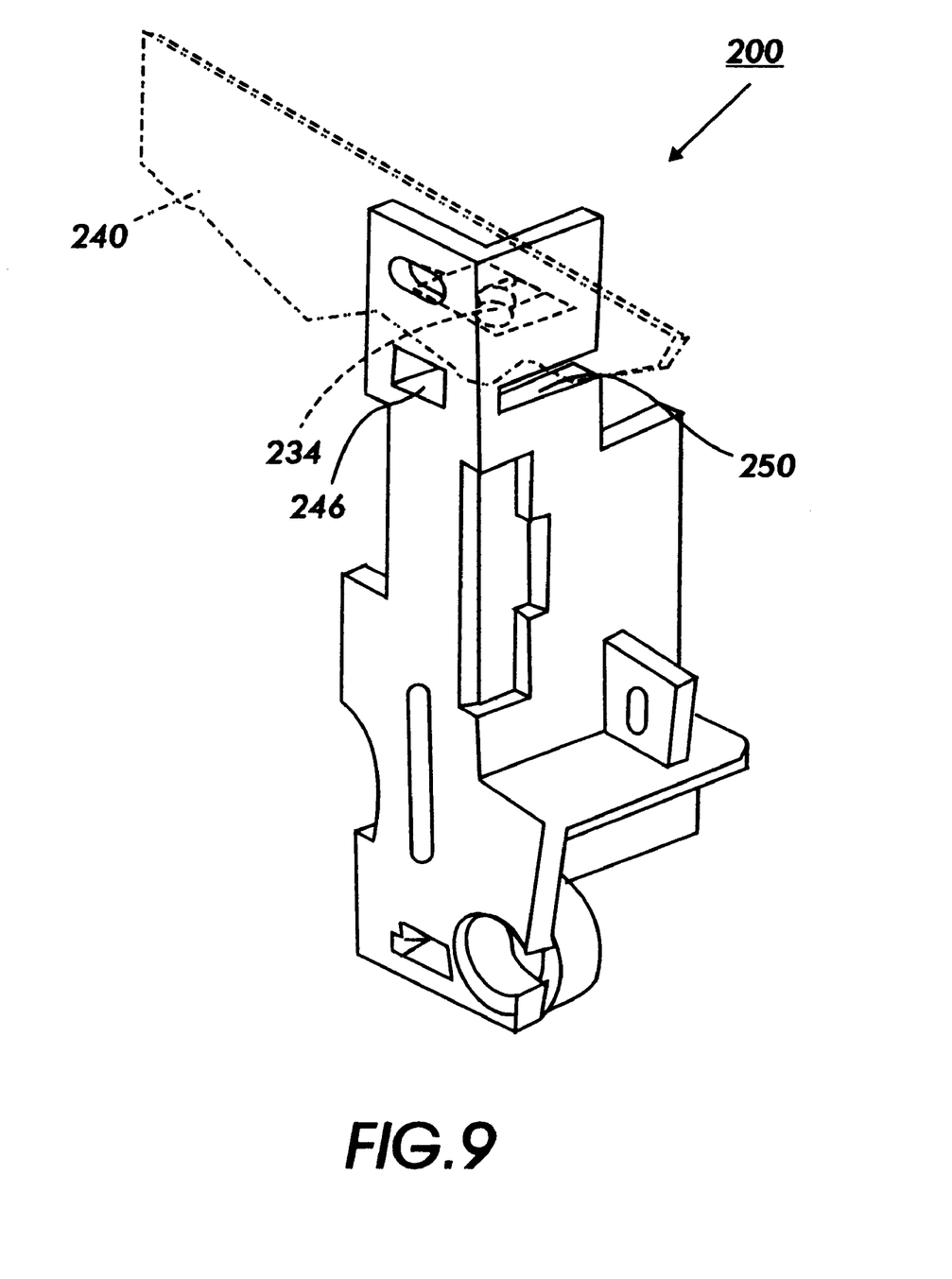
FIG. 9 is a perspective view of an alternate embodiment of a plastic component including the aperture according to the present invention.

Referring now to FIG. 9, a bracket 200 is shown. The bracket 200 includes aperture 234 extending parallel to the parting line plane 240. The aperture 234 is formed by first cavity 246 and second cavity 250. The cavities 246 and 250 are formed by protrusions similar to those shown in the die plates of FIGS. 7 and 8.

The bracket of FIG. 9 may be utilized anywhere within the printing machine, e.g. the bracket 230 may be used to support the photoreceptor module as shown in FIG. 6.

While the bracket of FIG. 9 as shown is used in the photoreceptor bracket of FIG. 7, it should be appreciated that the plastic component 130 may be utilized in any plastic component which requires an aperture or bore which may be positioned with a centerline parallel to the parting line.

By providing a plastic component having an aperture formed from opposed cavities extending from the outer surface of the plastic component, a plastic component may be provided which may have an aperture parallel to the parting line of the plastic component.

By providing a plastic component having cavities extending outwardly from opposed surfaces of the plastic component to form an aperture, a simple, accurate and inexpensive plastic component may be made with an accurate aperture parallel to the parting line.

By providing a plastic component having opposed cavities extending from opposed surfaces of the plastic component to provide for an aperture parallel to the parting line, and by providing voids or reliefs extending outwardly from the cavities flash may be able to accumulate in the voids thereby obviating the need for subsequent operations such as drilling.

By providing a mold for a plastic component including an aperture parallel to the parting line and by providing a mold die including lips extending from the protrusions required to make cavities to form an aperture voids or relief may be provided in the plastic component to receive the flash from the molding process thereby greatly extending the die life of the upper and lower mold cavities and also obviating the need for subsequent operations such as drilling.

While the invention herein has been described in the context of black and white photoreceptor CRU, it will be readily apparent that the device can be utilized in electrophotographic printing machine in which ease of service and customer service ability is desired.

It is, therefore, apparent that there has been provided in accordance with the present invention, a CRU module that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An electrophotographic printing machine of the type including a customer replaceable unit comprising:

a housing for mounting component have a service life less than the printing machine; and a plastic molded component operably associated with said housing, said component including a body including a first surface thereof and a second surface thereof, the second surface spaced from the first surface, said body defining a first cavity extending inwardly from the first surface, said body further defining a second cavity extending inwardly from the second surface, the first cavity overlapping the second cavity so as to form an aperture extending at least partially through the plastic molded article, said body further defining a recess extending inwardly from at least one of the first cavity and the second cavity at a location where the first cavity overlaps the second cavity so as to accommodate flash which may be formed during the molding process of the plastic molded article.

2. A printing machine according to claim 1, wherein said body further defining a third cavity extending inwardly from one of the first surface and the second surface the third cavity overlapping at least one of the first cavity and the second cavity.

3. A printing machine according to claim 1, wherein said body defines a recess extending inwardly form the first cavity and the second cavity at a location where the first cavity overlaps the second cavity.

4. A printing machine according to claim 1, wherein said recess defines a chamfer.

5. A printing machine according to claim 1, wherein said aperture defines a cylindrically shaped bore.

6. A plastic molded article, comprising a body including a first surface thereof and a second surface thereof, the second surface spaced from the first surface, said body defining a first cavity extending inwardly from the first surface, said body further defining a second cavity extending inwardly from the second surface, the first cavity overlapping the second cavity so as to form an aperture extending at least partially through the plastic molded article, said body further defining a recess extending inwardly from at least one of the first cavity and the second cavity at a location where the first cavity overlaps the second cavity so as to accommodate flash which may be formed during the molding process of the plastic molded article.

7. A plastic molded article according to claim 6, wherein said body further defining a third cavity extending inwardly from one of the first surface and the second surface the third cavity overlapping at least one of the first cavity and the second cavity.

8. A plastic molded article according to claim 7, wherein said body defines a recess extending inwardly from the first cavity and the second cavity at a location where the first cavity overlaps the second cavity.

9. A plastic molded article according to claim 6, wherein said recess defines a chamfer.

10. A plastic molded article according to claim 6, wherein said aperture defines a cylindrically shaped bore.

11. A customer replaceable unit for use in a printing machine comprising:

a housing for mounting component have a service life less than the printing machine; and a plastic molded component operably associated with said housing, said component including a body including a first surface thereof and a second surface thereof, the second surface spaced from the first surface, said body defining a first cavity extending inwardly from the first surface, said body further defining a second cavity extending inwardly from the second surface, the first cavity overlapping the second cavity so as to form an aperture extending at least partially through the plastic molded article, said body further defining a recess extending inwardly from at least one of the first cavity and the second cavity at a location where the first cavity overlaps the second cavity so as to accommodate flash which may be formed during the molding process of the plastic molded article.

12. A customer replaceable unit according to claim 11, wherein said body further defining a third cavity extending inwardly from one of the first surface and the second surface the third cavity overlapping at least one of the first cavity and the second cavity.

13. A customer replaceable unit according to claim 11, wherein said body defines a recess extending inwardly form the first cavity and the second cavity at a location where the first cavity overlaps the second cavity.

14. A customer replaceable unit according to claim 11, wherein said recess defines a chamfer.

15. A customer replaceable unit according to claim 11, wherein said aperture defines a cylindrically shaped bore.

* * * * *